United States Patent
Kim

(10) Patent No.: US 12,533,991 B2
(45) Date of Patent: Jan. 27, 2026

(54) METHOD AND SYSTEM FOR DETERMINING USE MODE OF SWAPPABLE ELECTRIC VEHICLE BATTERY

(71) Applicants: HYUNDAI MOTOR COMPANY, Seoul (KR); KIA CORPORATION, Seoul (KR)

(72) Inventor: Min Su Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 259 days.

(21) Appl. No.: 18/238,763

(22) Filed: Aug. 28, 2023

(65) Prior Publication Data
US 2024/0157845 A1 May 16, 2024

(30) Foreign Application Priority Data
Nov. 11, 2022 (KR) .......................... 10-2022-0150558

(51) Int. Cl.
*B60L 58/20* (2019.01)
*B60L 50/64* (2019.01)
*B60L 58/12* (2019.01)

(52) U.S. Cl.
CPC ............... *B60L 58/20* (2019.02); *B60L 50/64* (2019.02); *B60L 58/12* (2019.02); *B60L 2240/60* (2013.01)

(58) Field of Classification Search
None
See application file for complete search history.

(56) References Cited

U.S. PATENT DOCUMENTS

| | | | |
|---|---|---|---|
| 10,536,020 B2 * | 1/2020 | Hsiao | G01R 31/374 |
| 2013/0282472 A1 * | 10/2013 | Penilla | B60L 53/80 705/14.1 |
| 2018/0314262 A1 * | 11/2018 | Aiuchi | A61G 5/101 |
| 2020/0164760 A1 * | 5/2020 | Sohmshetty | B60L 53/80 |

* cited by examiner

*Primary Examiner* — James J Lee
*Assistant Examiner* — Jonathan E Reinert
(74) *Attorney, Agent, or Firm* — Morgan Lewis & Bockius LLP

(57) ABSTRACT

A method for controlling a swappable battery detachably mounted in a vehicle which includes a main battery fixed therein, includes determining a use mode among a plurality of modes which are different in a charge amount of charging the main battery by the swappable battery based on destination information of a navigation system, and controlling the swappable battery to charge the main battery based on the determined use mode to charge the main battery.

9 Claims, 4 Drawing Sheets

METHOD AND SYSTEM FOR DETERMINING USE MODE OF SWAPPABLE ELECTRIC VEHICLE BATTERY

CROSS-REFERENCE TO RELATED APPLICATION

The present application claims priority to Korean Patent Application No. 10-2022-0150558, filed on Nov. 11, 2022, the entire contents of which is incorporated herein for all purposes by this reference.

BACKGROUND OF THE PRESENT DISCLOSURE

Field of the Present Disclosure

The present disclosure relates to a method and a system for controlling a battery in a vehicle.

Discussion of Related Art

A general electric vehicle (EV) system has one main battery, and the main battery may be charged through an external charger. The electric vehicle system may convert direct current (DC) power charged in the main battery into alternating current (AC) power through an inverter, and may apply the power to a motor which is in charge of driving the vehicle.

Meanwhile, when energy is insufficient in the battery of the vehicle, the vehicle is stopped, and the battery needs to be charged for the vehicle to move again.

Generally, there has been a problem in that a charging time for charging a battery varies widely according to a battery charging method of a vehicle.

Generally, when a battery of a vehicle is charged by a general charger rather than a quick charger, a battery charging time of the vehicle is long, and as a solution to the present problem, a swappable battery system has been developed.

However, to date, there is a lack of control strategies and detailed functions for efficiently controlling such a swappable battery system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure may be directed to providing a method and a system for controlling a battery in a vehicle configured for increasing the usability of a replaceable battery of a vehicle by providing a new battery use mode.

Also, various aspects of the present disclosure may be directed to providing a method and system for controlling a battery in a vehicle configured for providing a new control technology and a control strategy for a swappable battery system.

An exemplary embodiment of the present disclosure may reflect a user's battery usage needs and enable a user to select a desired battery use mode.

According to an exemplary embodiment of the present disclosure, a method for controlling a swappable battery detachably mounted in a vehicle which includes a main battery fixed therein includes determining a use mode among a plurality of modes which are different in a charge amount of charging the main battery by the swappable battery based on destination information of a navigation system, and controlling the swappable battery to charge the main battery based on the determined use mode to charge the main battery.

In an exemplary embodiment of the present disclosure, the determining of the use mode includes determining a first mode in which the charge amount of charging the main battery is a predetermined maximum amount or a second mode in which the charge amount of charging the main battery is a predetermined minimum threshold charging amount.

In an exemplary embodiment of the present disclosure, the determining of the use mode is performed based on a comparison between a first distance value from a current location of the vehicle to a corresponding destination of the destination information and a second distance value which is an expected drivable distance of the vehicle by power of the main battery when the destination information is registered in the navigation system.

In an exemplary embodiment of the present disclosure, the determining of the use mode includes determining, when the first distance value is greater than the second distance value, whether a replacement place of the swappable battery is present at a position corresponding to a fourth distance value from the current location of the vehicle to the replacement place based on map information of the navigation system, wherein the fourth distance value is greater than the second distance value and smaller than a third distance value of a total drivable distance value of the vehicle, and determining the first mode as the use mode when the replacement place is present at the position corresponding to the fourth distance value.

In an exemplary embodiment of the present disclosure, the controlling of the swappable battery includes determining charging power of the swappable battery based on a current remaining charging amount of the swappable battery and a time taken for the vehicle to arrive at the replacement place located at the position of the fourth distance value, upon the first mode being determined as the use mode, and controlling the swappable battery to charge the main battery by the charging power of the swappable battery.

In an exemplary embodiment of the present disclosure, the determining of the use mode includes determining the second mode as the use mode when the destination information is not registered on the navigation system, when the first distance value is equal to or less than the second distance value, or when there is no replacement place of the swappable battery at the position corresponding to the fourth distance value.

In an exemplary embodiment of the present disclosure, the determining of the use mode and the controlling of the swappable battery are performed when a charge amount of the main battery is smaller than a predetermined first threshold value and a charge amount of the swappable battery is greater than a predetermined second threshold value.

In an exemplary embodiment of the present disclosure, the method further includes controlling the swappable battery to charge the main battery by a predetermined rated maximum power of the swappable battery when the first mode is determined.

According to an exemplary embodiment of the present disclosure, a system for controlling a swappable battery detachably mounted in a vehicle which includes a main battery fixed therein includes a control unit configured to determine a use mode among a plurality of modes which are different in a charge amount of charging the main battery by the swappable battery based on destination information of a navigation system, and control the swappable battery to charge the main battery based on the use mode.

In an exemplary embodiment of the system of the present disclosure, the control unit is configured to determine a first mode in which the charge amount of charging the main battery is a predetermined maximum amount or a second mode in which the charge amount of charging the main battery is a predetermined minimum threshold charging amount as the use mode.

In an exemplary embodiment of the system of the present disclosure, the control unit is further configured to determine the first mode or the second mode as the use mode based on a result of comparing a first distance value from a current location of the vehicle to a corresponding destination of the destination information with a second distance value which is an expected drivable distance of the vehicle by power of the main battery when the destination information is registered in the navigation system.

In an exemplary embodiment of the system of the present disclosure, the control unit is further configured to determine whether a replacement place of the swappable battery is present at a position corresponding to a fourth distance value from the current location of the vehicle to the replacement place based on map information of the navigation system, wherein the fourth value is greater than the second distance value and smaller than a third distance value of a total drivable distance value of the vehicle when the first distance value is greater than the second distance value, and determine the first mode as the use mode when the replacement place is present at the position corresponding to the fourth distance value.

In an exemplary embodiment of the system of the present disclosure, the control unit is further configured to determine the charging power of the swappable battery based on a current remaining charging amount of the swappable battery and a time taken for the vehicle to arrive at the replacement place located at the position corresponding to the fourth distance value, upon the first mode being determined as the use mode, and control the swappable battery to charge the main battery by the charging power of the swappable battery.

In an exemplary embodiment of the system of the present disclosure, the control unit is further configured to determine the second mode as the use mode when the destination information is not registered on the navigation system, when the first distance value is equal to or less than the second distance value, or when there is no replacement place of the swappable battery at the position corresponding to the fourth distance value.

In an exemplary embodiment of the system of the present disclosure, the control unit is further configured to determine whether a charge amount of the main battery is smaller than a predetermined first threshold value and a charge amount of the swappable battery is greater than a predetermined second threshold value before determining the use mode.

In an exemplary embodiment of the system of the present disclosure, the control unit is further configured to control the swappable battery to charge the main battery by a predetermined rated maximum power of the swappable battery when the first mode is determined.

According to an exemplary embodiment of the present disclosure, a vehicle includes a navigation system, a main battery fixed in the vehicle and configured to supply driving power for the vehicle, a swappable battery detachably mounted in the vehicle and configured to supply charging power to the main battery, and a control unit configured to determine, upon a charging amount of the main battery being determined to be smaller than a predetermined first threshold value and a charging amount of the swappable battery being determined to be greater than a predetermined second threshold value, a use mode among a plurality of modes which are different in a charge amount of charging the main battery, based on destination information of the navigation system, to be a first mode or a second mode, and control the swappable battery based on the use mode, wherein the charge amount of charging the main battery is a predetermined maximum amount in the first mode and the charge amount of charging the main battery is a predetermined minimum threshold charging amount in the second mode.

In an exemplary embodiment of the vehicle of the present disclosure, when the destination information is registered in the navigation system, the control unit is further configured to determine the first mode or the second mode as the use mode based on a result of comparing a first distance value from a current location of the vehicle to a corresponding destination of the destination information with a second distance value which is an expected drivable distance of the vehicle through power of the main battery.

In an exemplary embodiment of the vehicle of the present disclosure, the control unit is further configured to, when the first distance value being greater than the second distance value, determine whether the replacement place is present at a position corresponding to a fourth distance value from the current location of the vehicle to the replacement place based on map information of the navigation system, wherein the fourth distance value is greater than the second distance value and smaller than a third distance value of a total drivable distance value of the vehicle, and determine the first mode as the use mode when the replacement place is present at the position corresponding to the fourth distance value.

In an exemplary embodiment of the vehicle of the present disclosure, the control unit is further configured to determine the second mode as the use mode when the destination information is not registered on the navigation system, when the first distance value is equal to or less than the second distance value, or when there is no replacement place of the swappable battery at the position corresponding to the fourth distance value.

The method and system for controlling a battery in a vehicle according to the exemplary embodiments of the present disclosure may provide a new battery use mode that does not exist in the related art, increasing the utility of a replaceable battery of a vehicle.

The method and a system for controlling a battery in a vehicle according to the exemplary embodiments of the present disclosure may change the replaceable battery control depending on the battery use needs of the customer, improving the marketability of the vehicle and/or the system for controlling a battery in a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
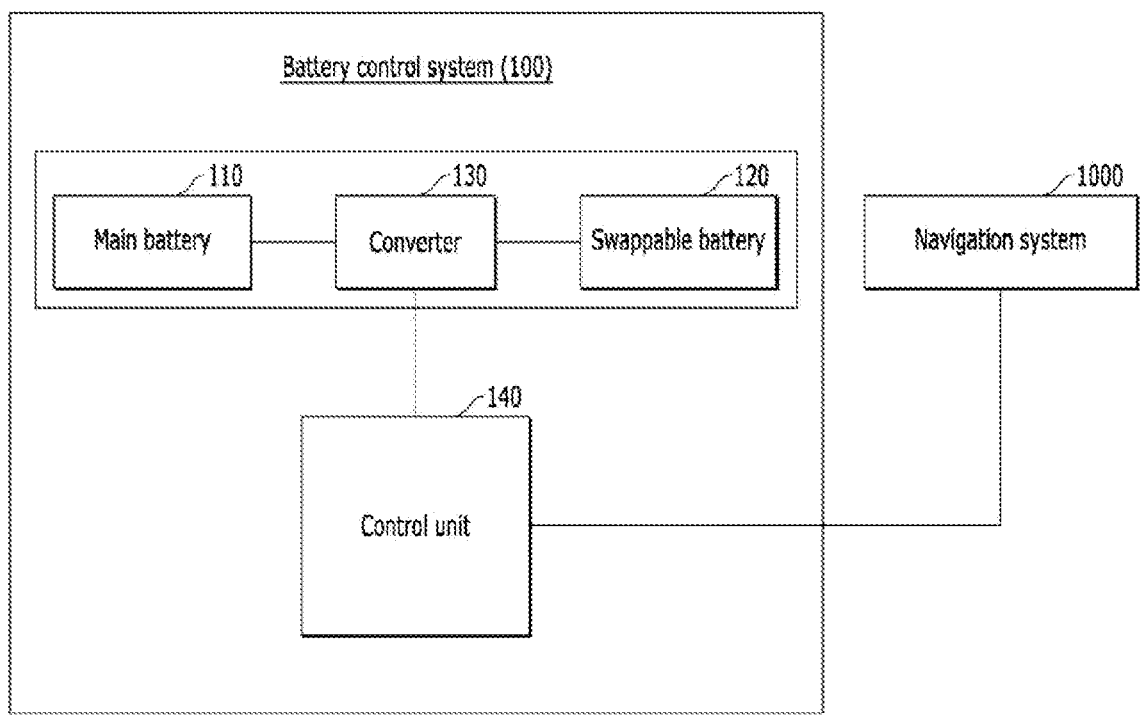
FIG. 1 is a block diagram of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In case where identical elements are included in various exemplary embodiments of the present disclosure, they will be provided the same reference numerals, and redundant description thereof will be omitted. In the following description, the terms "module" and "unit" for referring to elements are assigned and used interchangeably in consideration of convenience of explanation, and thus, the terms per se do not necessarily have different meanings or functions.

Furthermore, in describing the exemplary embodiments of the present disclosure, when it is determined that a detailed description of related publicly known technology may obscure the gist of the exemplary embodiments of the present disclosure, the detailed description thereof will be omitted. The accompanying drawings are used to help easily explain various technical features and it should be understood that the exemplary embodiments presented herein are not limited by the accompanying drawings. Accordingly, the present disclosure should be construed to extend to any alterations, equivalents and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

Unless otherwise defined, all terms including technical and scientific ones used herein include the same meanings as those commonly understood by one of ordinary skill in the art to which the present disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless so defined herein.

Furthermore, the term "unit" or "control unit", for example included in the names of a hybrid control unit (HCU), a motor control unit (MCU), etc. is merely a widely used term for naming a controller configured for controlling a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Embodiments of the present disclosure may provide a technology for controlling energy (also referred to as power) operation of a swappable battery to increase utilization of the swappable battery which is a replaceable battery.

For example, the method and the system for controlling a battery in a vehicle according to an exemplary embodiment of the present disclosure may implement the power use method of the swappable battery in two modes to determine whether to preferentially fill the charge amount of the main battery or to maximize the driving distance of the vehicle by increasing the efficiency of the battery control system. Based on such a determination, the method and system for controlling a battery in a vehicle according to an exemplary embodiment of the present disclosure may provide a technology capable of efficiently charging a main battery by selectively controlling a swappable battery of a vehicle.

Furthermore, the method and system for controlling a battery in a vehicle according to the exemplary embodiment of the present disclosure may provide a technology for controlling a main battery and a swappable battery of a vehicle in a direction desired by a driver by allowing the driver to select one of two modes of a power use scheme of the swappable battery through manipulation of the driver.

Hereinafter, operation principles and embodiments of the present disclosure will be described with reference to the accompanying drawings.

FIG. 1 is a block diagram of a vehicle according to an exemplary embodiment of the present disclosure.

Referring to FIG. 1, vehicle 1 may include a battery control system 100 and a navigation system 1000.

The battery control system 100 may include a main battery 110, a swappable battery 120, a converter 130, and/or a control unit 140.

The main battery 110 may be embedded in the vehicle 1.

The main battery 110 may be a super capacitor or a lithium ion battery. Of course, the battery may be a high voltage battery for an electric vehicle such as a nickel metal battery, a lithium polymer battery, or an all-solid battery. Furthermore, the main battery 140 may be one battery cell, or may be a battery pack in which the battery cells are configured in series and/or in parallel.

The main battery 110 may supply power to device of the vehicle 1, for example, power (e.g., high voltage power) to a motor that drives the vehicle 1.

The swappable battery 120 (also referred to as a replaceable battery) may be mounted on and/or detached from the vehicle 1 and may be replaceable. For example, the swappable battery 120 may be replaced at a swap station (also referred to as a swappable station or a replacement place of the swappable battery) configured for replacing the swappable battery for a vehicle.

The swappable battery 120 may be, but is not limited to, a lead acid battery, a nickel metal battery, a lithium polymer battery, or a lithium ion battery.

The swappable battery 120 may supply charging power to the main battery 110.

Furthermore, the swappable battery 120 may be charged by receiving charging power from the main battery 110.

The converter 130 may include a High Voltage DC-DC Converter (HDC).

The converter 130 may be configured for controlling the current flowing between the main battery 110 and the swappable battery 120 so that the main battery 110 and the swappable battery 120 may exchange power with each other.

The control unit 140 (also referred to as a control circuit) may be configured for controlling at least one device (e.g., the main battery 110, the swappable battery 120, and/or the converter 130) of the battery control system 100, and may perform various data processing and operations. The control unit 140 may include a processor and a memory.

Herein, in an exemplary embodiment of the present disclosure, the memory and the processor may be implemented as separate semiconductor circuits. Alternatively, the memory and the processor may be implemented as a single integrated semiconductor circuit. The processor may embody one or more processor(s).

For example, the control unit 140 may include a Battery Management System (BMS).

The control unit 140 may be configured for controlling the swappable battery 120 to be in one of two predetermined modes according to a predetermined condition.

The predetermined condition may be a condition according to a state of charge (SOC) value of the main battery 110 (also referred to as a charging amount), an SOC value of the swappable battery 120, whether destination information of the vehicle 1 is registered on the navigation system 1000, a distance from a current location of the vehicle 1 to a destination corresponding to the destination information registered on the navigation system 1000, a total drivable distance of the vehicle 1, a drivable distance of the vehicle 1 through the power of the main battery 110, a drivable distance of the vehicle 1 through the power of the swappable battery 120, whether a swap station is capable of replacing the swappable battery 120 in a driving path of the vehicle 1, and/or an expected arrival time of the vehicle 1 to the swap station.

A first mode (also referred to as fast swap mode) of the two predetermined modes is a mode for maximally charging the main battery 110 with the power of the swappable battery 120.

The first mode may refer to a mode for inducing the swappable battery 120 to be newly replaced by rapidly using the power of the swappable battery 120.

The first mode may allow the SOC value of the main battery 110 to be maintained close to a maximum value, for example, 100%, rather than the charging/discharging efficiency of the main battery 110 and the swappable battery 120.

For example, the first mode may allow the swappable battery 120 to charge the main battery 110 with the determined rated power or the predetermined rated maximum power.

For example, when the distance from the current location of the vehicle 1 to the swap station of the swappable battery 120 is longer than the expected drivable distance of the vehicle 1 through the power of the main battery 110, but is shorter than the total expected drivable distance of the vehicle 1, the probability of replacing the swappable battery 120 at the swap station may be increased. In consideration of this point, the first mode may allow the main battery 110 to be charged with rated power determined so that the power of the swappable battery 120 is fully consumed when the vehicle 1 arrives at the swap station, through the distance from the current location of the vehicle 1 to the swap station and the estimated time to arrive at the swap station.

For example, when the first mode is selected according to a user operation, the first mode may be to charge the power of the main battery 110 as fast as possible through the power of the swappable battery 120. In other words, when the first mode is selected by a user operation, the first mode may allow the main battery 110 to be charged with the predetermined rated maximum power of the swappable battery 120.

For example, in the first mode, when the SOC value of each of the main battery 110 and the swappable battery 120 is 50%, the SOC value of the main battery 110 is 100% through the power of the swappable battery 120, and the swappable battery 120 of the vehicle 1 may be replaced with a new swappable battery.

A second mode (also referred to as slow swap mode) among the two predetermined modes is a mode for maximally controlling the driving distance of the vehicle 1 while delaying the replacement cycle of the swappable battery 120.

The second mode may be focused on increasing the charging/discharging efficiency of the battery control system 100 while controlling the temperature swing of the main battery 110, the swappable battery 120, and/or the converter 130 to be minimized. Here, the minimization of the temperature swing means that the swappable battery 120 adjusts the charging power of the main battery 110 to maintain a temperature range including an optimal charging/discharging efficiency.

In general, when the temperatures of the main battery 110, the swappable battery 120, and/or the converter 130 are high, the charging/discharging efficiency is lowered when the main battery 110 is charged through the power of the swappable battery 120. Accordingly, as long as the SOC value of the main battery 110 is not lowered to the minimum threshold SOC Value, the charging may not be performed to increase the driving efficiency of the vehicle 1. In consideration of the present point, the second mode may be to prevent the main battery 110 from being charged through the swappable battery 120 when the efficiency of each of the main battery 110, the swappable battery 120, and/or the converter 130 is below a predetermined threshold efficiency. Furthermore, the second mode may allow the main battery 110 to be charged through the power of the swappable battery 120 when the SOC value of the main battery 110 becomes a predetermined minimum SOC.

For example, when the SOCs of the main battery 110 and the swappable battery 120 are 50%, respectively, the second mode may maximize the driving distance of the vehicle 1 by optimally using the two batteries 110,120.

The navigation system 1000 may include a Global Positioning System (GPS), and may receive satellite signals propagated from Global Positioning System (GPS) satellites through the GPS. The satellite signal may include position coordinates of the vehicle 1.

The navigation system 1000 may be configured to generate and output the driving route information of the vehicle 1 by identifying the location information and the driving environment information of the vehicle 1 by matching the location coordinates of the vehicle 1 identified through the satellite signal to a map pre-stored in a memory of the navigation system 1000. Also, the navigation system 1000 may register destination information of the vehicle 1 based on a user input, and may be configured to generate and output driving route information of the vehicle 1 to a place corresponding to the destination information.

Meanwhile, although not shown, the vehicle 1 may further include an interface to electrically connect or communicate with the BMS 100 and the navigation system 1000 through the interface.

For example, the interface may include a communication module. For example, the communication module may include a communication module configured for performing communication between devices of the vehicle 1, for example, control unit area network (CAN) communication and/or Local Interconnect Network (LIN) communication, through a vehicle communication network. Furthermore, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module).

Also, referring to FIG. 1, although the swappable battery 120 is illustrated as being disposed inside the vehicle 1 in the exemplary embodiment of FIG. 1, the swappable battery 120 may be in an extended form independently existing outside the vehicle 1 according to another exemplary embodiment of the present disclosure. Also, for example, the converter 130 may also be disposed outside the vehicle 1.

Figure 2:
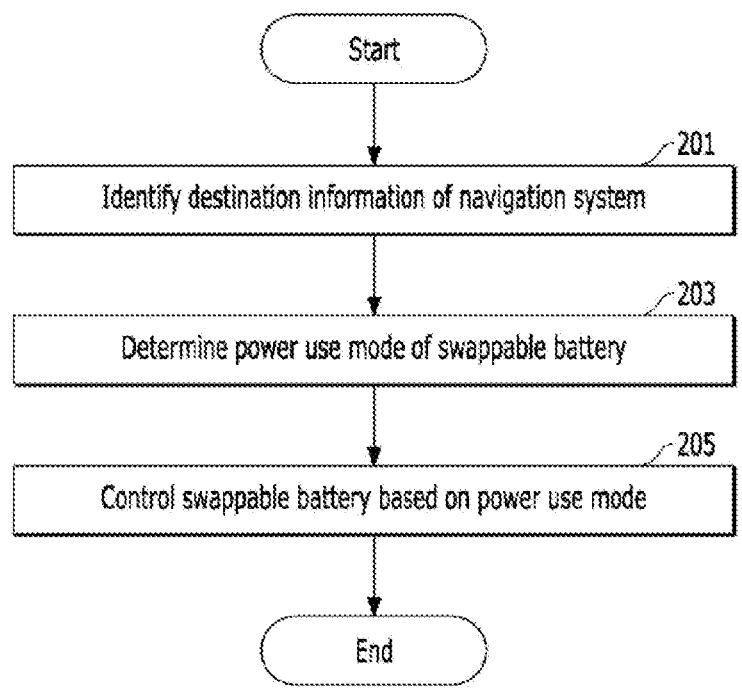
FIG. 2 is a flowchart of an operation of a system for controlling a battery in a vehicle according to an exemplary embodiment of the present disclosure.

FIG. 2 is a flowchart of an operation of the battery control system 100 (and/or the control unit 140) of the vehicle 1, according to an exemplary embodiment of the present disclosure.

Referring to FIG. 2, the battery control system 100 may identify destination information of the navigation system 1000 (201).

The battery control system 100 may be configured to determine a power use mode of the swappable battery 120 based on the destination information of the navigation system 1000 (203).

The power use mode of the swappable battery 120 may be referred to as a use mode for varying a charging amount.

The battery control system 100 may be configured to determine the power use mode as a first mode or a second mode. The first mode may allow the amount of charge of the main battery 110 of the vehicle 1 to be maximally charged through the power of the swappable battery 120. Also, the second mode may be to charge the main battery 110 through the power of the swappable battery 120 when the charge amount of the main battery 110 becomes a predetermined minimum threshold charge amount.

The battery control system 100 may identify whether destination information of the vehicle 1 is registered in the navigation system 100.

When the destination information is not registered on the navigation system 1000, the battery control system 100 may be configured to determine the second mode as the power use mode of the swappable battery 120.

When the destination information of the vehicle 1 is registered in the navigation system 100, the battery control system 100 may be configured to determine the power use mode based on a comparison between a first distance value from the current location of the vehicle 1 to the corresponding destination of the destination information and a second distance value which is an expected drivable distance of the vehicle 1 through the power of the main battery 110.

For example, when the first distance value is greater than the second distance value, the battery control system 100 may be configured to determine whether the swap station of the swappable battery 120 is present at a position corresponding to a fourth distance value in which the distance value from the current location of the vehicle 1 to the swap station of the swappable battery 120 is greater than the second distance value and smaller than the total drivable third distance value of the vehicle 1 based on the map information of the navigation system 1000.

When the swap station of the swappable battery 120 is located at the position corresponding to the fourth distance value, the battery control system 100 may be configured to determine the first mode as the power use mode of the swappable battery 120.

Meanwhile, the battery control system 100 may be configured to determine the second mode as the power use mode when the first distance value is equal to or less than the second distance value or when there is no swap station of the swappable battery 120 at a position corresponding to the fourth distance value.

The battery control system 100 may be configured for controlling the swappable battery 120 based on the determined power use mode (205).

When the determined power use mode is the first mode, the battery control system 100 may be configured to determine the charging power of the swappable battery 120 based on the current remaining charge amount of the swappable battery 120 and the time required for the vehicle 1 to arrive at the swap station of the swappable battery 120 located at the position corresponding to the fourth distance value. The battery control system 100 may be configured for controlling the swappable battery 120 so that the main battery 110 is charged through the determined charging power of the swappable battery 120.

When the determined power use mode is the second mode, the battery control system 100 may monitor whether the charge amount of the main battery 110 becomes a predetermined minimum threshold charge amount. The battery control system 100 may be configured for controlling the swappable battery 120 so that the main battery 110 is charged through the power of the swappable battery 120 when the charge amount of the main battery 110 becomes a predetermined minimum threshold charge amount.

The above-described operations 201, 203, and/or 205 may be performed while the charge amount of the main battery 110 is less than a predetermined first threshold value (e.g., 95%), and the charge amount of the swappable battery 120 is greater than a predetermined second threshold value (e.g., 0%).

Figure 3A:
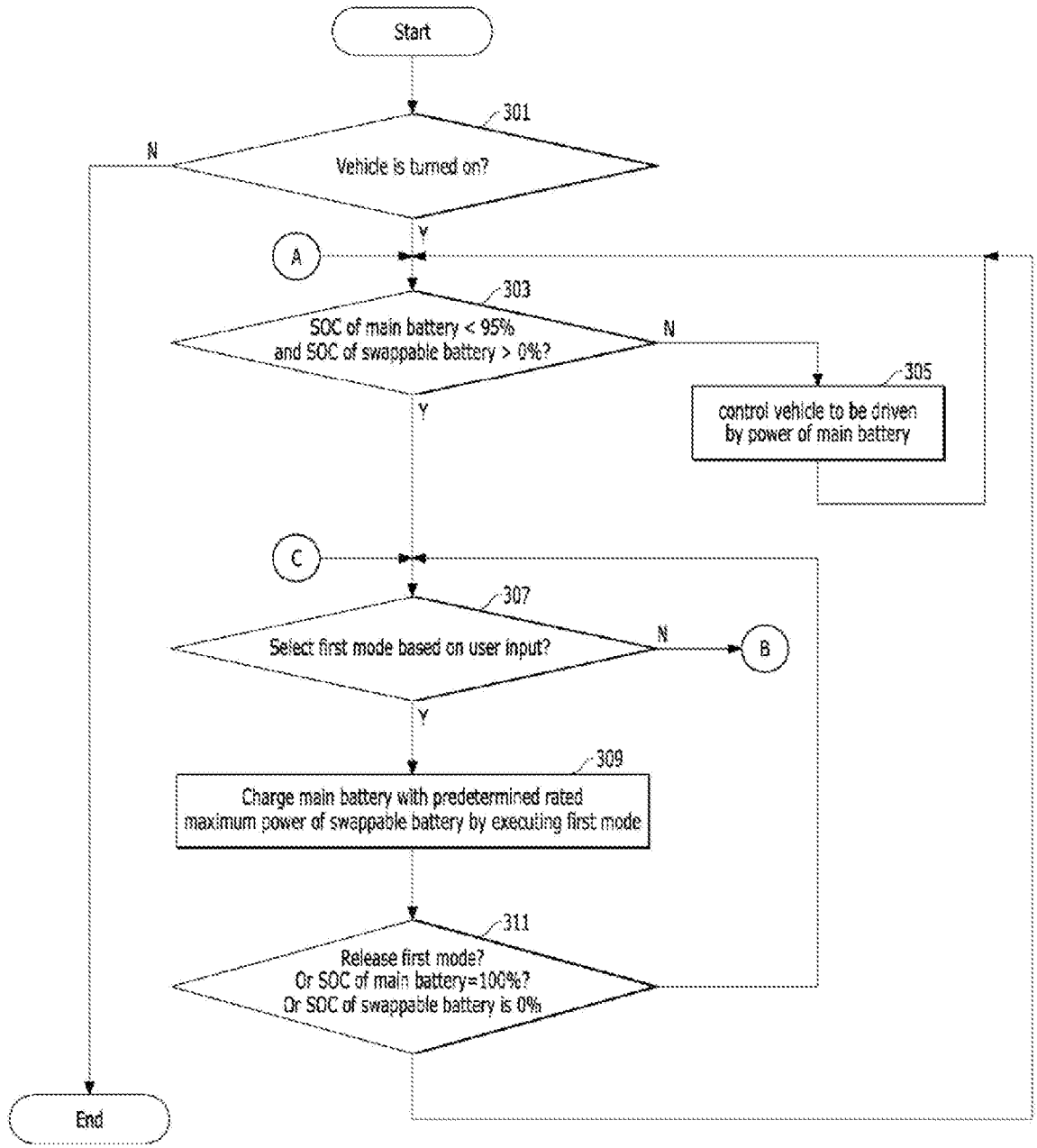
FIG. 3A and FIG. 3B are flowcharts of an operation of a system for controlling a battery in a vehicle according to an exemplary embodiment of the present disclosure.
Figure 3B:
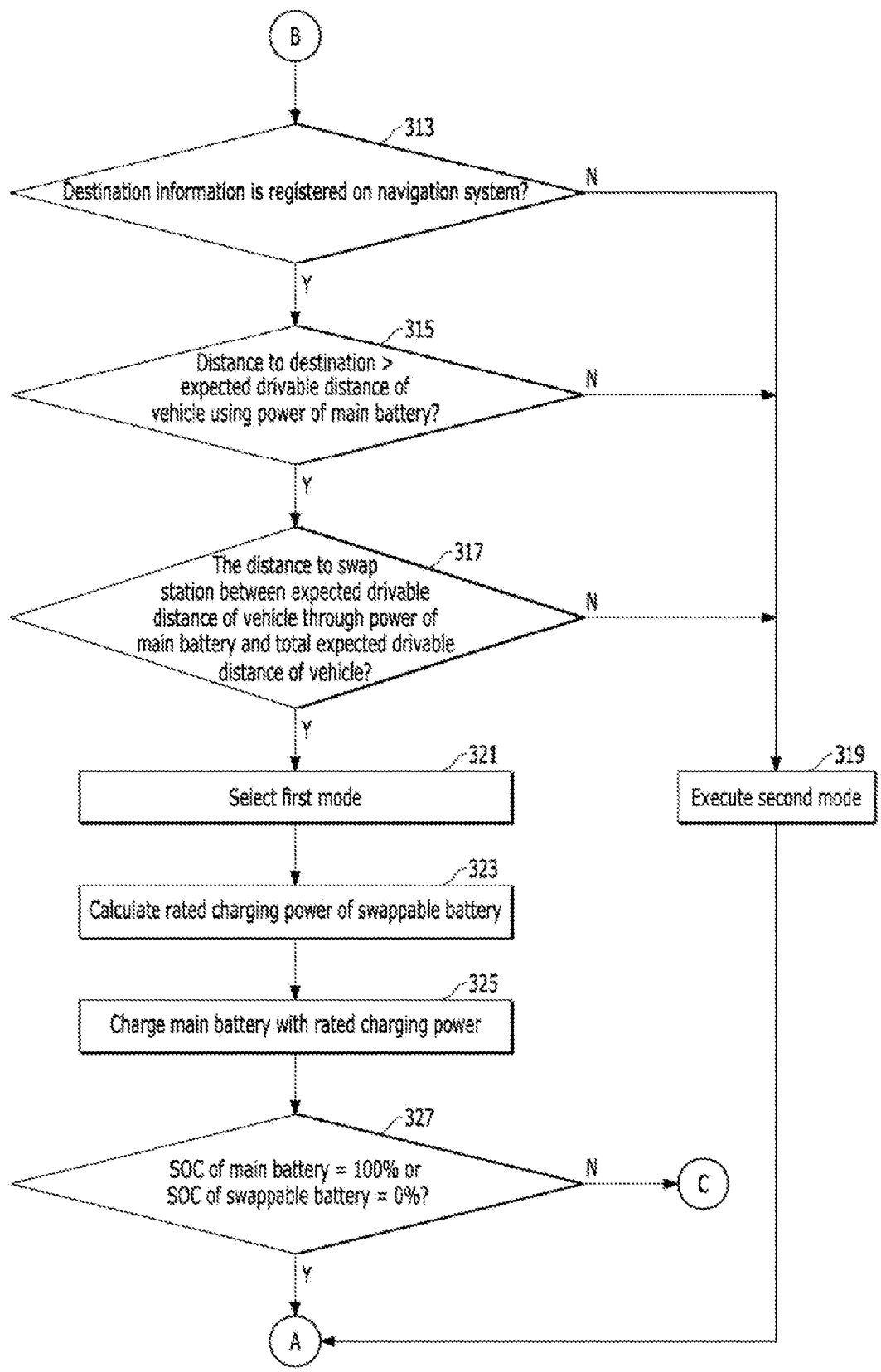

FIG. 3A and FIG. 3B are flowcharts illustrating operations of the battery control system 100 (and/or the control unit 140) of the vehicle 1, according to an exemplary embodiment of the present disclosure.

The battery control system 100 may be configured to determine whether the vehicle 1 is turned on (301).

The battery control system 100 may perform operation 303 when the vehicle 1 is in the start-on state, and otherwise terminate the exemplary embodiment of the present disclosure.

When the vehicle 1 is turned on, the battery control system 100 may be configured to determine whether the SOC value of the main battery 110 is less than 95% and the SOC value of the swappable battery 120 is greater than 0% (303).

The battery control system 100 may perform operation 303 to identify whether the swappable battery 120 is available and to prevent frequent charging and overcharging of the main battery 110, so that the operation mode of the swappable battery 120 is determined and operated only when hysteresis, that is, the SOC value of the battery 110 is less than 95%.

The battery control system 100 may perform operation 307 when the SOC value of the main battery 110 is less than 95% and the SOC value of the swappable battery 120 is greater than 0%, and may perform operation 305 otherwise.

When it is determined in operation 303 that the SOC value of the main battery 110 is not less than 95% and the SOC value of the swappable battery 120 is not greater than 0%, the battery control system 100 may supply the power of the main battery 110 to the motor for driving the vehicle 1 and control the vehicle 1 to be driven by the power of the main battery 110 (305).

The battery control system 100 may perform operation 303 while controlling the vehicle 1 to be driven by the power of the main battery 110.

Then it is determined in operation 303 that the SOC value of the main battery 110 is less than 95% and the SOC value of the swappable battery 120 is greater than 0%, the battery control system 100 may be configured to determine whether the first mode is selected based on a user input (307).

When the first mode is selected based on the user input (or when the driver selection mode is executed), the battery control system 100 may perform operation 309, and otherwise perform operation 313.

When it is determined in operation 307 that the first mode is selected based on the user input, the battery control system 100 may execute the first mode to control the swappable battery 120 so that the main battery 110 is charged with the predetermined rated maximum power of the swappable battery 120 (309).

For example, upon identifying the selection of the first mode based on the user input, the battery control system 100 may perform operation 309 to provide the entire remaining power of the swappable battery 120 to the main battery 110 as rapidly as possible so that the main battery 110 is charged.

The battery control system 100 may perform operations 307 and 309 to allow the user to selectively charge the main battery 110 according to the user's intention in consideration of a situation where it is determined that the main battery 110 needs to be charged, separately from automatically controlling according to a predetermined algorithm of the battery control system 100.

During operation 309, the battery control system 100 may release the first mode and determine whether the SOC value of the main battery 110 is 100% or the SOC value of the swappable battery 120 is 0% (311).

When the first mode is released and the SOC value of the main battery 110 is 100% or the SOC value of the swappable battery 120 is 0%, the battery control system 100 may perform operation 303 again. Otherwise, may perform operation 307 again.

On the other hand, according to the determination result of operation 307, that is, when there is no selection of the first mode based on the user input, the battery control system 100 may be configured to determine whether the destination information is registered in the navigation system 1000 of the vehicle 1 (313).

The navigation system 1000 may perform operation 313 to control the swappable battery 120 based on the registered destination of the navigation system 1000.

The battery control system 100 may perform operation 315 when the destination information is registered in the navigation system 1000 of the vehicle 1, and may perform operation 319 when the destination information is not registered.

The battery control system 100 may be configured to determine whether the distance from the current location of the vehicle 1 to the corresponding destination of the destination information is greater than the expected drivable distance of the vehicle 1 through the power of the main battery 110 (315).

When it is assumed that the vehicle 1 can travel to the destination with only the power of the main battery 110, the battery control system 100 may perform operation 315 to maintain the existing control of the battery control system 100 without charging the main battery 110 with the power of the swappable battery 120, because the entire power ratio of the vehicle 1 is reduced due to a loss of power during charging when the main battery 110 is charged through the swappable battery 120.

The battery control system 100 may perform operation 317 when the distance from the current location of the vehicle 1 to the destination is greater than the expected drivable distance of the vehicle 1 through the power of the main battery 110, and may perform operation 319 otherwise.

The battery control system 100 may be configured to determine whether the distance to the swap station of the swappable battery 120 is between the expected drivable distance of the vehicle 1 through the power of the main battery 110 and the total expected drivable distance of the vehicle 1 (317).

The battery control system 100 may be configured to determine whether the distance to the swap station of the swappable battery 120 is between the expected drivable distance of the vehicle 1 through the power of the main battery 110 and the total expected drivable distance of the vehicle 1 based on map information including destination information of the navigation system 1000, the SOC value of the main battery 110 (or distance to empty (DTE) data of the main battery 110), and/or the SOC value of the swappable battery 120.

In the battery control system 100, when the distance from the current location of the vehicle 1 to the swap station of the swappable battery 120 is longer than the expected drivable distance of the vehicle 1 through the power of the main battery 110, but is shorter than the total expected drivable distance of the vehicle 1, the probability of replacing the swappable battery 120 may increase. To determine such a situation, the battery control system 100 may perform operation 317. In other words, when there is a high probability of replacing the swappable battery 120, the battery control system 100 may perform operation 317 to maximally charge the main battery 110 according to operations to be described below.

The battery control system 100 may perform operation 321 when the distance to the swap station of the swappable battery 120 is between the expected drivable distance of the vehicle 1 through the power of the main battery 110 and the total expected drivable distance of the vehicle 1, and otherwise perform operation 319.

The battery control system 100 may execute the second mode according to the determination result of operation 313, operation 315, or operation 317 to control the main battery 110 and the swappable battery 120 so that the efficiency of the main battery 110 and the swappable battery 120 is maintained to the maximum (319).

When it is determined in operation 317, that is, when the swap station is present within the expected drivable distance of the vehicle 1 through the power of the main battery 110 and the total expected drivable distance of the vehicle 1, the battery control system 100 may select the first mode (321).

The battery control system 100 may be configured to determine a rated charging power of the swappable battery 120 in response to the selection of the first mode (323).

The battery control system 100 may be configured to determine the rated charging power so that the main battery 110 is charged with a constant power of the swappable battery 120 while minimizing the load of the swappable battery 120 while the vehicle 1 is moving to the swap station of the swappable battery 120.

The rated charging power of the swappable battery 120 may be determined by dividing the current residual energy of the swappable battery 120 by an expected time required for the vehicle 1 to move to the swap station.

The battery control system 100 may be configured to determine the rated charging power of the swappable battery 120 based on data of the navigation system 1000 (e.g., location information of the swap station, expected time required to reach the swap station), the SOC value of the main battery 110, the SOC value of the swappable battery 120, the DTE of the main battery 110, and/or the DTE of the swappable battery 120.

The battery control system 100 may charge the main battery 110 with the rated charging power of the swappable battery 120 (325).

The battery control system 100 may be configured to determine whether the SOC value of the main battery 110 is 100% or the SOC value of the swappable battery 120 is 0% in response to the charging of the main battery 110 (327).

The battery control system 100 may perform operation 303 again when the SOC value of the main battery 110 is 100% or the SOC value of the swappable battery 120 is 0%, and may perform operation 307 again otherwise.

The numerical values (e.g., 0%, 95%, 100%) in the above-described embodiment of FIG. 3 may be changed.

The above-described embodiments may be implemented in a form of a recording medium for storing instructions executable by a computer. The instructions may be stored in a form of a program code, and when executed by a processor, may be configured to generate a program module to perform operations of the disclosed exemplary embodiments of the present disclosure. The recording medium may be implemented as a non-transitory computer-readable recording medium.

The non-transitory computer-readable recording medium includes all types of recording medium in which computer-readable instructions are stored. For example, there may be a Read Only Memory (ROM), a Random Access Memory (RAM), a magnetic tape, a magnetic disk, a flash memory, an optical data non-transitory storage device, etc.

Also, the control unit of the above embodiment may include a processor (e.g., computer, microprocessor, CPU, ASIC, circuitry, logic circuits, etc.) and an associated non-transitory memory storing software instructions which, when executed by the processor, provides the functionalities of the control unit. Herein, the memory and the processor may be implemented as separate semiconductor circuits. Alternatively, the memory and the processor may be implemented as a single integrated semiconductor circuit. The processor may embody one or more processor(s).

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a swappable battery detachably mounted in a vehicle which includes a main battery fixed therein, the method comprising:
   determining, by a control unit, a use mode among a plurality of modes which are different in a charge amount of charging the main battery by the swappable battery based on destination information of a navigation system; and
   controlling the swappable battery to charge the main battery based on the determined use mode to charge the main battery,
   wherein the plurality of modes includes a first mode and a second mode,
   wherein the determining of the use mode includes:
      determining the first mode in which the charge amount of charging the main battery is a predetermined maximum amount or the second mode in which the charge amount of charging the main battery is a predetermined minimum threshold charging amount,
   wherein the determining of the use mode is performed based on a comparison between a first distance value from a current location of the vehicle to a corresponding destination of the destination information and a second distance value which is an expected drivable distance of the vehicle by power of the main battery in response that the control unit concludes that the destination information is registered in the navigation system,
   wherein the determining of the use mode further includes:
      determining, in response that the control unit concludes that the first distance value is greater than the second distance value, whether a replacement place of the swappable battery is present at a position corresponding to a fourth distance value from the current location of the vehicle to the replacement place based on map information of the navigation system, wherein the fourth distance value is greater than the second distance value and smaller than a third distance value of a total drivable distance value of the vehicle, and
      determining the first mode as the use mode in response that the control unit concludes that the replacement place is present at the position corresponding to the fourth distance value, and
   wherein the determining of the use mode further includes:
      determining the second mode as the use mode in response that the control unit concludes that the destination information is not registered on the navigation system, that the first distance value is equal to or less than the second distance value, or that there is no replacement place of the swappable battery at the position corresponding to the fourth distance value.

2. The method of claim 1, wherein the controlling of the swappable battery includes:
   determining charging power of the swappable battery based on a current remaining charging amount of the swappable battery and a time taken for the vehicle to arrive at the replacement place located at the position of the fourth distance value, upon the first mode being determined as the use mode, and
   controlling the swappable battery to charge the main battery by the charging power of the swappable battery.

3. The method of claim 1, wherein the determining of the use mode and the controlling of the swappable battery are performed in response that the control unit concludes that a charge amount of the main battery is smaller than a predetermined first threshold value and a charge amount of the swappable battery is greater than a predetermined second threshold value.

4. The method of claim 1, further includes controlling the swappable battery to charge the main battery by a predetermined rated maximum power of the swappable battery when the first mode is determined.

5. A system for controlling a swappable battery detachably mounted in a vehicle which includes a main battery fixed therein, the system comprising:
   a control unit configured to determine a use mode among a plurality of modes which are different in a charge amount of charging the main battery by the swappable battery based on destination information of a navigation system, and to control the swappable battery to charge the main battery based on the use mode,
   wherein the plurality of modes includes a first mode and a second mode,
   wherein the control unit is configured to determine the first mode in which the charge amount of charging the main battery is a predetermined maximum amount or the second mode in which the charge amount of charging the main battery is a predetermined minimum threshold charging amount as the use mode,
   wherein the control unit is further configured to determine the first mode or the second mode as the use mode based on a result of comparing a first distance value from a current location of the vehicle to a corresponding destination of the destination information with a second distance value which is an expected drivable distance of the vehicle by power of the main battery when the destination information is registered in the navigation system,
   wherein the control unit is further configured to determine whether a replacement place of the swappable battery is present at a position corresponding to a fourth distance value from the current location of the vehicle to the replacement place based on map information of the navigation system, wherein the fourth value is greater than the second distance value and smaller than a third distance value of a total drivable distance value of the vehicle when the first distance value is greater than the second distance value, and determine the first mode as the use mode in response that the control unit concludes that the replacement place is present at the position corresponding to the fourth distance value, and
   wherein the control unit is further configured to determine the second mode as the use mode in response that the control unit concludes that the destination information is not registered on the navigation system, that the first distance value is equal to or less than the second distance value, or that there is no replacement place of the swappable battery at the position corresponding to the fourth distance value.

6. The system of claim 5, wherein the control unit is further configured to determine the charging power of the swappable battery based on a current remaining charging amount of the swappable battery and a time taken for the vehicle to arrive at the replacement place located at the position corresponding to the fourth distance value, upon the first mode being determined as the use mode, and to control the swappable battery to charge the main battery by the charging power of the swappable battery.

7. The system of claim 5, wherein the control unit is further configured to determine whether a charge amount of the main battery is smaller than a predetermined first threshold value and a charge amount of the swappable battery is greater than a predetermined second threshold value before determining the use mode.

8. The system of claim 5, wherein the control unit is further configured to control the swappable battery to charge the main battery by a predetermined rated maximum power of the swappable battery when the first mode is determined.

9. A vehicle comprising:
a navigation system;
a main battery fixed in the vehicle and configured to supply driving power for the vehicle;
a swappable battery detachably mounted in the vehicle and configured to supply charging power to the main battery; and
a control unit configured to determine, upon a charging amount of the main battery being determined to be smaller than a predetermined first threshold value and a charging amount of the swappable battery being determined to be greater than a predetermined second threshold value, a use mode among a plurality of modes which are different in a charge amount of charging the main battery, based on destination information of the navigation system, to be a first mode or a second mode of the plurality of modes, and control the swappable battery based on the use mode, wherein the charge amount of charging the main battery is a predetermined maximum amount in the first mode and the charge amount of charging the main battery is a predetermined minimum threshold charging amount in the second mode, wherein, in response that the control unit concludes that the destination information is registered in the navigation system, the control unit is further configured to determine the first mode or the second mode as the use mode based on a result of comparing a first distance value from a current location of the vehicle to a corresponding destination of the destination information with a second distance value which is an expected drivable distance of the vehicle through power of the main battery, wherein the control unit is further configured to, when the first distance value being greater than the second distance value, determine whether the replacement place is present at a position corresponding to a fourth distance value from the current location of the vehicle to the replacement place based on map information of the navigation system, wherein the fourth distance value is greater than the second distance value and smaller than a third distance value of a total drivable distance value of the vehicle, and determine the first mode as the use mode in response that the control unit concludes that the replacement place is present at the position corresponding to the fourth distance value, and wherein the control unit is further configured to determine the second mode as the use mode in response that the control unit concludes that the destination information is not registered on the navigation system, that the first distance value is equal to or less than the second distance value, or that there is no replacement place of the swappable battery at the position corresponding to the fourth distance value.

\* \* \* \* \*